Dec. 24, 1940.   F. J. REILLY ET AL   2,226,480
APPARATUS FOR RIPENING TOMATOES
Filed Dec. 7, 1937   2 Sheets-Sheet 2
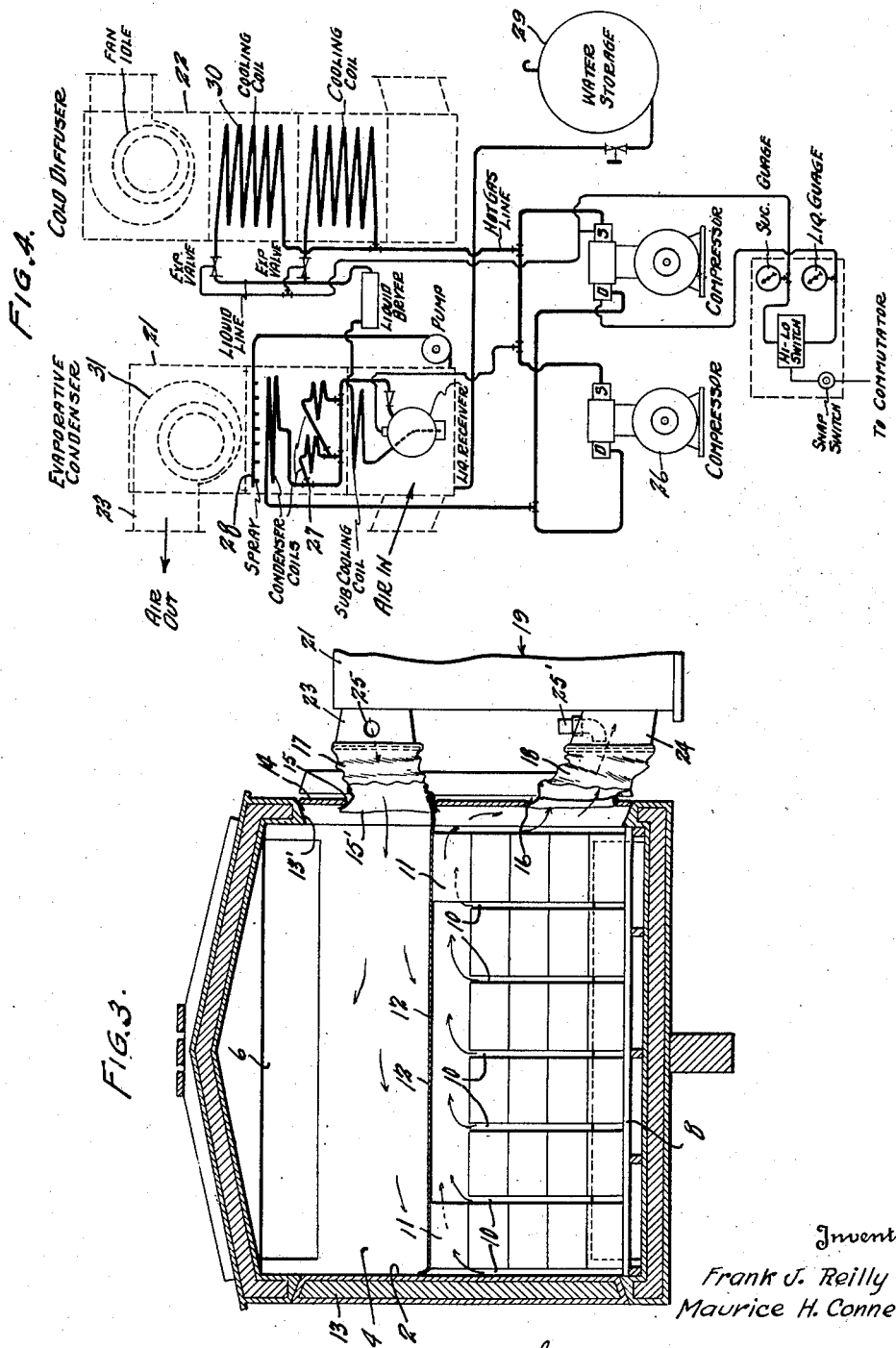
Inventor
Frank J. Reilly
Maurice H. Connell
By Semmes, Keegin + Semmes,
Attorneys Patented Dec. 24, 1940

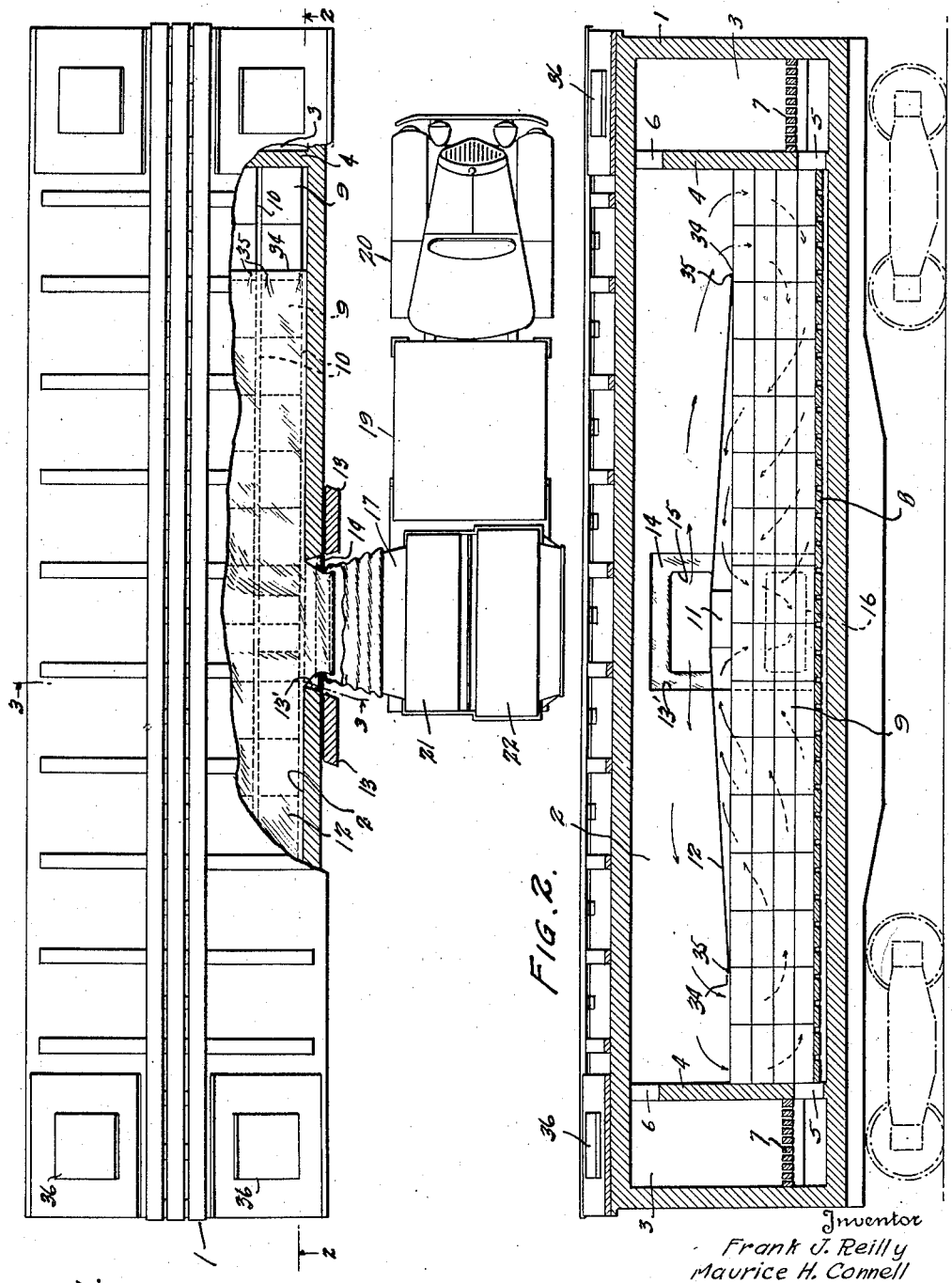

2,226,480

UNITED STATES PATENT OFFICE 2,226,480

APPARATUS FOR RIPENING TOMATOES

Frank J. Reilly and Maurice H. Connell, Miami, Fla., assignors to General American Precooling Corporation, Chicago, Ill. a corporation of Delaware Application December 7, 1937, Serial No. 178,602

2 Claims. (Cl. 237—28)

Our invention relates to air conditioning and more particularly has reference to an apparatus for ripening farm produce, that has been picked green or partially ripened, by means of a stream of air, the humidity of which is kept constant while the heat content is being gradually increased.

At the present time when tomatoes are picked from the vine in a green condition, they are first wrapped in tissue paper and are then packed in suitable hampers such as lugs or crates. These hampers are then loaded into refrigerator cars, which are not iced, and are shipped with the ventilators open. When the car reaches it destination, the hampers are removed from the car, and the tomatoes are unpacked and unwrapped and placed in the ripening chamber of some storage warehouse.

At the present time the temperature of ripening chambers are not raised above 70 degrees, due to the fact that a higher temperature has been found to destroy the texture of the fruit. We have found that this breakdown in texture is caused by a failure to keep the atmosphere of the chamber at a high degree of humidity. Tomatoes exposed to this low temperature require from 7 days, to in some cases four weeks, to fully ripen. After the tomatoes are sufficiently ripened they are rewrapped and reloaded in the hampers and are then dispensed to the wholesale or retail trade.

It is obvious from the above description that the present method of ripening green tomatoes results in a great loss of time, space and labor. By this slow ripening process about 40% of the tomatoes are also lost through decay.

One of the objects of our invention is to provide an apparatus to overcome these disadvantages.

Another object of our invention is to provide a process of ripening farm produce, which comprises causing a stream of heated air, of the proper humidity, to flow over the hampers in which the produce has been packed.

Still another object of our invention is to provide a process during which, by maintaining a constant high humidity, the temperature of the produce may be greatly increased without causing a breakdown of its texture.

Yet another object of our invention is to fully ripen green tomatoes within a sixteen hour period, by treatment with a stream of conditioned air.

We have found that if green or partially ripened farm produce, that has been previously wrapped and packed in suitable hampers such as lugs or crates, are placed in a chamber and then treated by a stream of heated air, the humidity of which is kept near the saturation point, that the produce may be ripened in a much shorter period than by the methods of the present practice, without the necessity of uncrating. In our process the heat content of the air stream is gradually increased until the temperature of the storage chamber reaches a predetermined maximum, the humidity at all times remaining constant and near the saturation point.

At the proper time the air stream is stopped, the doorway to the storage chamber is closed and the produce is left for a period of sixteen hours. At the end of this time the produce is fully ripened and ready for market. The ventilators of the storage chamber may then be opened and the produced iced, if it is to be kept for any length of time.

In carrying out our process it is not necessary to unwrap the produce or to remove it from the hampers, and the texture of the fruit is protected by the slow absorption of the condensed water, on the fruit and wrappers, caused by the great humidity of the air stream.

In the accompanying drawings there is shown one form by which our invention may be carried out, its being understood that various changes may be made therein and other kinds of farm produce treated without exceeding the scope of the inventive concept.

In the drawings:

Fig. 1 is a top plan view of a freight car with a conditioning unit in operative position at the side of the car, and showing the incoming and outgoing conduits in operative position.

Figure 2 is a sectional view taken along line 2—2 of Fig. 1, and looking in the direction of the arrows.

Fig. 3 is a sectional view taken along line 3—3 of Fig. 1, looking in the direction of the arrows.

Fig. 4 is a diagrammatic view of our air conditioning unit.

As previously explained, our invention applies generally to the ripening of farm produce that have been packed in hampers and placed in a ripening chamber, but it applies more particularly to the ripening of tomatoes forming the lading of a railway car preparatory to shipping. By ripening the tomatoes in the railway car, instead of in a warehouse storage chamber, extra handling of the fruit is avoided.

In the drawings a freight car, designated generally by the numeral 1, is provided with a storage chamber 2, and ice bunkers 3. The bunker walls 4 may be of solid construction, and provided with a lower opening 5 and an upper opening 6 or they may be of a screen construction. A drain rack 7 may be provided in the ice bunkers 3 and a raised flooring 8 in the storage chamber 2.

The lading, generally designated by the numeral 9 consists of suitable hampers such as lugs or crates filled with green tomatoes which have been wrapped in tissue paper.

As best shown in Fig. 3 the hampers which constitute the lading 9 are preferably placed in rows spaced so as to leave longitudinal air passages 10. The outer rows of the lading carry a crate or other means to form a support, as shown at 11, for a sheet of flexible material 12. The usual doors 13 are positioned in the center of the car 1, and in practicing our invention the doors on one side of the car are opened and there is inserted in the doorway 13' a false door 14. This false door 14 is provided with an upper aperture 15 and a lower aperture 16.

When the interior of the car is to be conditioned, extensible tubes 17 and 18 are attached to openings 15 and 16 respectively of the false door 14, and the outer edge of the flexible sheet material 11 is inserted into the upper aperture 15 as shown at 15'. These extensible tubes 17 and 18 are carried by a portable air conditioning unit, designated generally by the numeral 19. This air conditioning unit 19 consists of a truck 20 upon which is mounted an evaporative condenser 21 and a cold diffuser 22 provided with their necessary operating units. The evaporative condenser 21 is provided with an outlet duct 23 and an air intake duct 24.

As best shown in Fig. 4, outlet duct 23 is attached to the extensible tube 17 and inlet duct 24 is attached to the extensible tube 18. In the outlet duct 23 is a port 25 which may be of any suitable size and is adapted to admit atmospheric air into the otherwise closed system. An L-shaped ventilator 25' is also provided on duct 24 to exhaust some of the air laden with carbon dioxide which is formed by the ripening of the tomatoes. Obviously, as air is exhausted through the ventilator 25', an equal amount of atmospheric air is drawn into the system through the port 25.

The evaporative condenser 21 has associated therewith one or more compressors 26 which are designed to compress and force a suitable refrigerating agent into a condensing coil designated generally by the numeral 27. This condensing coil is cooled by a spray 28 which is supplied with water from a storage tank 29. After giving up its heat of compression the refrigerating agent travels through cooling coil 30 where it expands, and then returns to the compressor 26. The evaporative condenser 21 is equipped with an air circulating fan 31.

It is obvious from the above description that if air is drawn from the interior of the car 1 through the extensible tube 18 by means of the fan 31 that it will pass through the duct 24 and thence over the condenser coils and through the evaporating water from the spray 28, and will then be returned to the interior of the car by the duct 23 and extensible tube 17.

In passing over the coils 27 and through the water spray 28 the temperature of the stream of air is raised and also its water vapor content. The increase in the temperature of the air is controlled, by the admission of atmospheric air through the port 25, in order that the degree of humidity of the air stream will not be lowered by a too rapid increase in the temperature. If enough water vapor is not being absorbed to maintain the humidity of the air stream constant, atmospheric air is admitted to lower the rate of increase in the temperature of the air stream. The ports 25 and 25' may also be regulated so as to control the amount of carbon dioxide in the conditioned air arising from the ripening of the tomatoes. This regulation of port sizes may be accomplished in any suitable manner, such as by dampers (not shown).

After the conditioned air leaves extensible tube 17, it enters the car through the upper aperture 15 of the door 14 and then divides and travels towards both ends of the car above the flexible sheet material 12 until it reaches the extremities 34 of this material. This flexible sheet material 12, covers about three-fourths of the area of the lading and is secured to the lading by any suitable means as shown at 35. After reaching extremities 34 of the flexible sheet material 12 the conditioned air is drawn down through the air passages 10 and out through the duct 16 to the air conditioning unit 19.

During this entire operation the hatches 36, in the roof of the car 1, are kept closed and the circulation of air is continued until the temperature of the interior of the car reaches a temperature of practically 110° F. By admitting atmospheric air into the cycle, whenever the temperature of the air stream is increasing too rapidly, and by regulation of the volume of the water spray, the humidity may be kept constant at approximately 95 per cent during this increase in temperature.

After the proper temperature has been reached, the false door is withdrawn from the center door of the car and the doors 13 are closed and the car is then ready for shipment. Due to the maintenance of a high degree of humidity, moisture condenses on the tissue papers in which the tomatoes are wrapped and the skins of the tomatoes, and this moisture is slowly absorbed by and protects the tomatoes during the ripening process which continues while the car is being forwarded to its destination.

From the above description, it is believed apparent that we have provided a process and apparatus for ripening tomatoes, while in shipment, which is very rapid and economical. The high temperatures causes a rapid ripening of the fruit without injury to the texture because of the high humidity which is maintained throughout the process. By the use of our apparatus, a conditioned stream of air, of the proper humidity, can be directed to every portion of a car and brought in contact with the surfaces of all the farm produce.

It should be noted that our process eliminates unpacking the tomatoes for ripening purposes followed by a subsequent repacking and shortens the period of ripening from a minimum of seven days to sixteen hours. This rapid ripening also prevents the loss of tomatoes through decay which is incurred in the slower methods.

While we have described, for purposes of illustration, one form of our invention, it is obvious that it is not to be confined to the precise details of construction herein set forth. Neither is our process limited to the treatment of tomatoes as it is apparent that other farm produce may be ripened by the use of our apparatus and process.

We therefore intend that our invention be only limited by the prior art and the scope of the appended claims.

We claim:

1. An apparatus for ripening farm produce which constitutes the lading of a car having a center doorway comprising a unit positioned exteriorly of the car, means to heat and humidify the air, said means being associated with the unit, a false door positioned in the doorway of the car, said false door being provided with an upper and lower aperture, a conduit connected to the discharge side of the said unit to the upper aperture to convey the heated and humidified air into the car, said conduit being provided with valve controlled means to admit untreated air into the conditioned air stream, a substantially air impervious member extending the width of the car and lying flat upon the top load save in the vicinity of the ends of the car, a conduit connecting the lower aperture in the false door to the unit and adapted to convey the air from the car to the unit, and valve controlled means situated in said conduit to vent a portion of the conditioned air into the atmosphere.

2. An apparatus for ripening farm produce which constitutes the lading of a car having a center doorway comprising a unit positioned exteriorly of the car, means to heat and humidify air, said means being associated with the unit, a conduit connected to the discharge side of the said unit and extending through the upper portion of the said center doorway to convey the heated and humidified air into the car, said conduit being provided with valve controlled means to admit untreated air into the conditioned air stream, a substantially air-impervious member extending the width of the car and lying flat upon the top load save in the vicinity of the ends of the car, a conduit extending from the lower portion of the said doorway to the unit and adapted to convey the air from the car to the unit after it has passed through the contents of the car, and valve controlled means situated in said conduit to vent a portion of the conditioned air into the atmosphere.

FRANK J. REILLY.
MAURICE H. CONNELL.